(No Model.)
S. D. POOLE.
DEVICE FOR ATTACHING CULTIVATOR SHOVELS.
No. 521,549. Patented June 19, 1894.
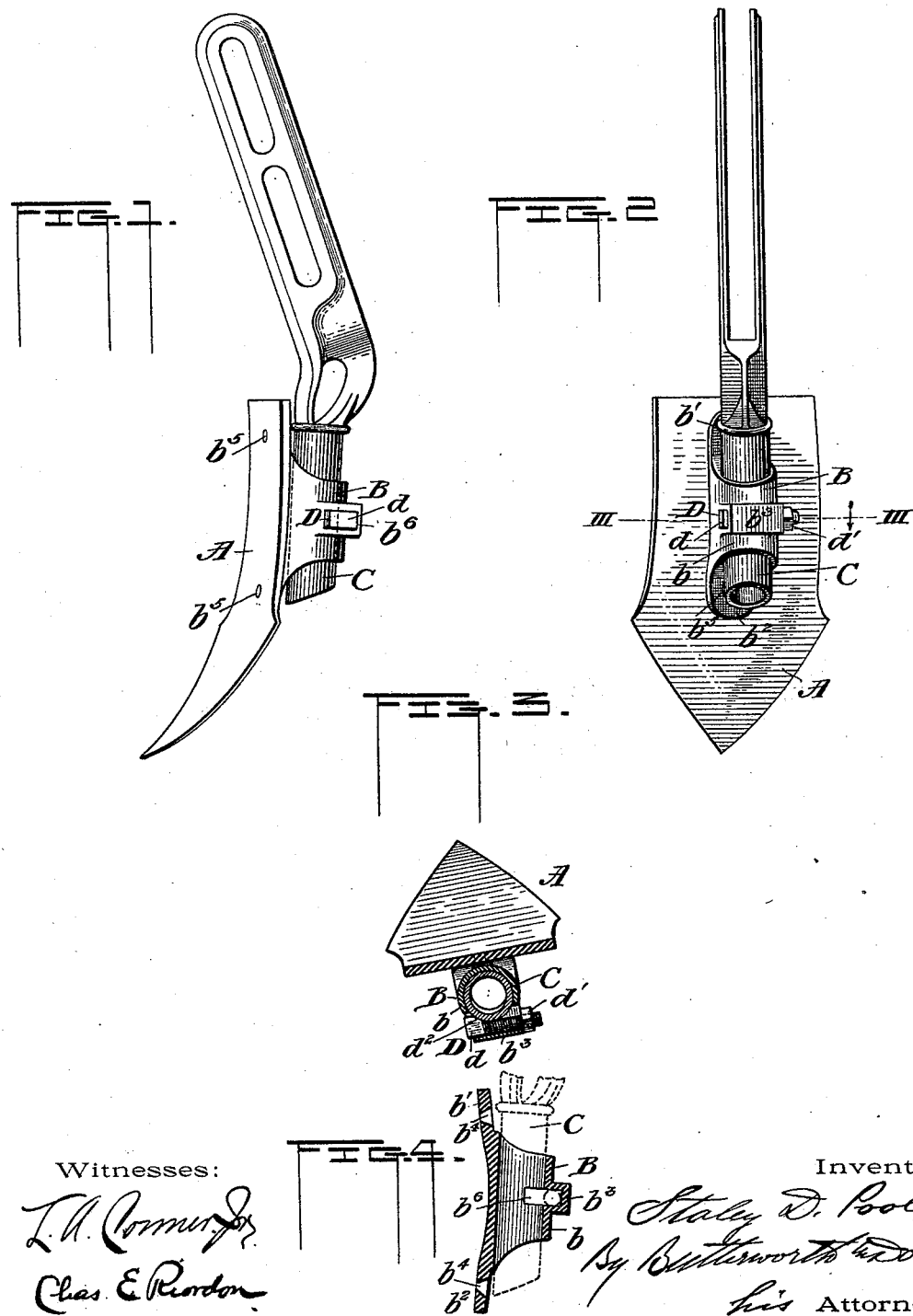
Witnesses:
Inventor.
Staley D. Poole
By Butterworth & Dowell
his Attorneys

UNITED STATES PATENT OFFICE.

STALEY D. POOLE, OF MOLINE, ILLINOIS, ASSIGNOR TO THE DEERE & COMPANY, OF SAME PLACE.

DEVICE FOR ATTACHING CULTIVATOR-SHOVELS.

SPECIFICATION forming part of Letters Patent No. 521,549, dated June 19, 1894.

Application filed February 19, 1894. Serial No. 500,785. (No model.)

*To all whom it may concern:*

Be it known that I, STALEY D. POOLE, a citizen of the United States, residing at Moline, in the county of Rock Island and State of Illinois, have invented certain new and useful Improvements in Devices for Attaching Cultivator-Shovels; and I do hereby declare the following to be a full, clear, and exact description of the invention, such as will enable others skilled in the art to which it appertains to make and use the same.

My invention has relation to improved devices for attaching the shovel block of a cultivator to its shank. Heretofore the shovels in a cultivator have been so secured to the shanks of the cultivator beams or standards as to permit only a limited vertical and lateral adjustment, and the purpose of the present invention is to add to the adjustability of the shovels, and to provide improved securing means therefor.

The invention consists in the features of construction and combination of parts hereinafter fully described and specifically pointed out in the claims at the end of the description.

In the accompanying drawings forming a part of this specification, Figure 1 is a side elevation of a cultivator shank with attached shovel block and shovel constructed in accordance with my invention. Fig. 2 is a rear elevation of the shank with the shovel and block in perspective. Fig. 3 is a transverse section on the line III—III of Fig. 2; and Fig. 4 is a central, vertical section of the block or socket detached from the shovel.

A, indicates the shovel, and B, the block having a socket which receives the shank C, of the cultivator beam or standard. The block B, preferably consists of the tubular portion or socket $b$, ears $b'$, and $b^2$, and rectangular, horizontal off-set $b^3$. The ears $b'$, and $b^2$, are provided with openings $b^4$, through which pass the bolts or rivets $b^5$, for securing the block to the shovel. The ends of the horizontal off-set $b^3$, are open, and the sides of the tubular socket are slotted in line with said open ends of the off-set to form an opening $b^6$, at each side of the socket of sufficient width to receive the securing wedge-bolt D. The shank C, is cylindrical (or may be polygonal) in cross-section and preferably cast hollow to combine lightness with strength.

The shovel block is applied to the shank C, by inserting the latter in the socket $b$, as clearly shown in the drawings, and is firmly secured thereto by means of the bolt D, having a wedge-shaped head $d$, and a fastening device or nut $d'$, at its opposite end. The wedge surface $d^2$, of the bolt head is forced against the shank C, by the tightening of the nut $d'$, thus firmly clamping the shank against the wall of the tubular socket as clearly illustrated in Fig. 3. It will be apparent that when the nut $d'$, is loosened, the shovel block may be readily adjusted vertically upon the shank, and laterally even to the extent of a complete revolution around the shank, thus affording an unlimited or maximum lateral adjustment, as well as the required vertical adjustment by simple and inexpensive means.

Having thus fully described my invention, what I claim as new, and desire to secure by Letters Patent of the United States, is—

1. The combination with the shank, of the vertically adjustable and rotatable shovel block provided with a tubular socket to receive the shank, and a removable bolt fitting an opening through the block and having an abutting wedge-shaped head for securing the parts together, substantially as described.

2. The combination with the cylindrical shank, of the shovel and the shovel block secured to the shovel and having a tubular portion to receive the shank and an aperture intersecting the opening through the block so as to receive a clamping bolt, and a wedge-shaped bolt fitting said aperture and serving to bind the parts together, substantially as described.

3. The combination with the shank of a cultivator beam, of a shovel block consisting of a tubular portion to receive the shank and a horizontal off-set with opening therethrough, together with a wedge-bolt seated in said off-set and adapted to clamp the shank against the wall of the socket, substantially as described.

In testimony whereof I affix my signature in presence of two witnesses.

STALEY D. POOLE.

Witnesses:
A. R. EBI,
C. T. MOREY.